United States Patent [19]

Drew, Jr. et al.

[11] Patent Number: 4,921,205
[45] Date of Patent: May 1, 1990

[54] LENS MOLD ASSEMBLY

[75] Inventors: Arthur J. Drew, Jr.; Donald J. Ratkowski, both of Mesa, Ariz.

[73] Assignee: Sola USA, Inc., Mesa, Ariz.

[21] Appl. No.: 195,027

[22] Filed: May 17, 1988

[51] Int. Cl.$^5$ ............................................. B29D 11/00
[52] U.S. Cl. ..................................... 249/61; 249/83; 249/134; 264/1.7; 264/2.3; 264/2.7; 425/808
[58] Field of Search ................... 425/808; 264/1.1, 1.7, 264/2.3, 2.4, 2.5, 2.6, 2.7; 249/61, 83, 134, 160

[56] References Cited

U.S. PATENT DOCUMENTS

| | | | |
|---|---|---|---|
| 3,806,079 | 4/1974 | Beattie | 425/808 |
| 4,188,353 | 2/1980 | Neefe | 264/2.7 |
| 4,247,492 | 1/1981 | Neefe | 425/808 |
| 4,441,795 | 4/1984 | Lobdell | 425/808 |
| 4,565,348 | 1/1986 | Larsen | 425/808 |

FOREIGN PATENT DOCUMENTS 2040213  8/1980  United Kingdom ................. 264/2.7

Primary Examiner—James C. Housel
Attorney, Agent, or Firm—Richard R. Mybeck

[57] ABSTRACT

A mold assembly for casting optical lenses in which an integral lens blank-mold cup unit is created by placing liquid monomers in a cup mold which tightly adheres to polymerized lens material. A radial die is disposed upon the cup mold to contain the monomers during polymerization and to provide the polymerized material with an optical surface. A contact lens is manufactured from the integral lens blank-mold cup unit by machining off the first cup and then extraneous portions of the blank to create a finished lens.

22 Claims, 1 Drawing Sheet

LENS MOLD ASSEMBLY

INTRODUCTION

The present invention relates to a new and unique means and methods for manufacturing contact lenses and more particularly to novel means and methods for casting contact lens blanks in which the lens material is deliberately placed in and cured for adherence to the mold cup in which it is thereafter shipped to a contact lens manufacturer who fabricates the contact lens for the fitter (i.e., ophthalmologist, optometrist or optician).

BACKGROUND OF THE INVENTION

Lenses formed of plastic material for optical applications are well known. A primary use for such lenses is as contact lenses. Generally, contact lenses fall into two major categories one of which is generally characterized as soft hydrophilic contact lenses and the other of which is characterized as rigid gas permeable or hard contact lenses which are generally hydrophobic. In addition to characterization of lenses as "soft" or "hard", contact lenses are often classified as corneal or scleral. A corneal lens is a contact lens whose main bearing portion rests upon the cornea of the eye. Another specialized type of lens is the intraocular lens which is surgically implanted into the eye.

Because of the stringent requirements for first quality contact lenses, extreme precision is required in the making of these lenses. Most plastic contact lens blanks are formed by initially casting an elongated cylindrical rod from a plastic material, such, for example, as cellulose acetate butyrate, silicone acrylate, fluorosilicone acrylate, polymethyl methacrylate, and the like. The cylindrical rod is then transversely cut to form a number of cylindrical lens blanks or buttons. The blanks, having generally opposite planar surfaces, are thereafter furnished to the lens manufacturer where each is machined to prescription and thereafter shipped for fitting to the patient by the fitter. Various machining operations may be accomplished on the blanks. For example, it is common practice to machine the lens blank using a lathe equipped with a diamond bit or other machine tool such as a spherical rotating tool bit. However, the machining operation will impart markings in the surface of the lenses which impairs optical quality and the lens surface must be therefore be very carefully polished to remove the machined surface markings. Underpolishing will leave lathe lines on the optical surface while overpolishing will cause orange peel and a poor quality optical surface.

Another problem in forming lenses from elongated rods is that it is difficult to fabricate such rods having a uniform density. A non-uniform density in the rod creates considerable optical problems such as variations in the refractive index and in the mechanical strength of the manufactured lens.

In an effort to avoid some of the problems of which are inherent in manufacturing plastic contact lens blanks from sections cut from plastic rods, the prior art suggests the formation of contact lenses by pouring the plastic between two parallel spaced glass sheets to form therebetween a plastic sheet having clear surfaces. The plastic sheet is then cut into squares that are slightly larger than the desired diameter of the circular lens blanks. The square pieces are positioned between spindles and are rotated while the periphery is machined by a cutting tool to the desired diameter. Such a procedure is described in U.S. Pat. No. 3,651,192.

Attempts have been also made to cast high quality plastic lenses. For instance, U.S. Pat. No. 3,380,718 suggests the use of a lower concave mold which is filled with allyl diglycol carbonate. A convex mold is lowered by a centering rod mechanism into the material. Heat is applied until the liquid is in the gel stage. Pressure is further increased after the gel stage to reduce shrinkage and other undesirable characteristics. While this process represents an advance in the state of the art, it is still generally limited to special types of lenses, such as bifocal lenses. It is clearly not applicable to contact lenses or to the various plastic materials conventionally used to produce contact lenses. Warpage as well as shrinkage frequently occurs with this method.

Another attempt at improving the methodology of casting contact lens was presented by Neefe in U.S. Pat. No. 4,457,880 in which a lens blank having a finished optical surface is cast from a liquid monomer beneath an optical-surfaced upper mold which is made from a resinous material which adheres to the upper surface of the polymerized lens material. While this approach provided a "handle" for the resulting lens blank while it was being machined, it did nothing to reduce internal stresses on the lens or facilitate shipment and carried with it the further risk of damage and loss when the finished lens blank fell from the "handle" during machining or, conversely, had to be forcibly removed from the mold to which it was stuck. A critical feature of Neefe is that the lens blank be totally non-adherent to the mold cup.

In addition to the prior art deficiencies enumerated above, another serious disadvantage of the prior art arises from the extremely abrasive nature of the lens blanks produced for rigid gas permeable and soft lenses and the seriously adverse effect such blanks have on the life of the diamond tool used to machine the blank into a usable optical lens. Thus, still another unfilled need in the optics industry requires the development of means and methods to substantially reduce the amount of machining required for abrasive lens materials by current practices. It is toward the elimination of these several deficiencies in the prior art that this invention is directed.

BRIEF SUMMARY OF THE INVENTION

The present invention relates to a new and unique method of casting optical lens blanks into a molded cup specially formulated and designed to cause the optical lens material, when cured, to adhere firmly thereto. The method is especially applicable to the production of soft and other daily or extended wear contact lens, intraocular lenses, and other optical lenses. The lens material is cured in the mold cup and in the course thereof firmly adheres to the cup to create an integral blank-mold cup structure, herein referred to as "lens button", which is shipped as a unit to the lens manufacturer where the lens button is appropriately machined to specification and finished to provide a contact lens for subsequent delivery to a filter for installation into a patient. As will appear, the means and methods of the present invention substantially eliminate the major problems confronting the industry and substantially prolong the life of the diamond tools used therewith. Further, as will be later detailed, the method of the present invention produces lenses having substantially less internal stress and a more perfect optical lens surface than has heretofore been obtainable. Further, the method of the present invention produces substantially less rejects and is generally easier to control than the prior art practices thereby enhancing the overall economics of lens production.

Accordingly, a prime object of the present invention is to provide a new and improved method of manufacturing contact lenses which produces an integral mold cup button which, when machined, is capable of substantially reducing the abrasive action on and hence extending the useful life of diamond tool employed to shape and finish the final contact lens.

Another object of the present invention is to provide means and methods of producing contact lenses having substantially less internal stress and enhanced optical surfaces than heretofore obtainable by prior practices.

A further object of the present invention is to provide new and improved means and methods for producing contact lens blanks in a novel shippable mold cup button form which can be readily converted into contact lenses.

Still another object of the present invention is to provide novel and unique means and methods of producing contact lenses having more uniform and consistent dimensional tolerances than has been obtainable by prior art means and methods.

These and still further objects, as shall hereinafter appear, are readily fulfilled by the present invention in a unique and totally unexpected manner as will be readily discerned from the following detailed description of preferred embodiments thereof, especially when read in conjunction with the accompanying drawing in which like parts bear like numbers throughout the several views.

DESCRIPTION OF PREFERRED EMBODIMENTS

The present invention relates to new and unique means and methods for manufacturing optical lenses by casting techniques. The resulting lenses may have concave or convex curved surfaces or planar surfaces, depending on the optical requirements for the lens. The curved surface, when the lens is finished, forms the anterior or posterior surface of the completed lens and, as will appear, finishing operations are substantially minimized. Furthermore, the present invention is uniquely applicable to the production of contact lenses of the corneal, scleral, bicurve, aspheric, toric, spherical, and lenticular type as well as intraocular lenses, photographic and magnifying lenses.

Figure 1A:
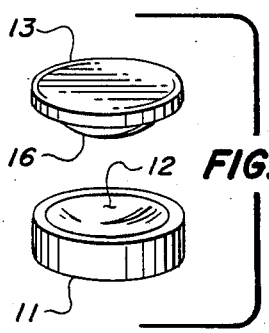
FIG. 1A is an exploded isometric view of a mold cup and a radius die cover for use in practicing the present invention.
Figure 1B:
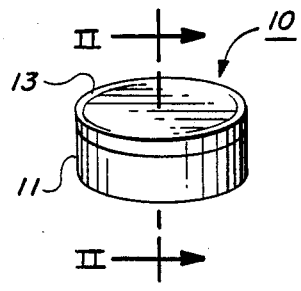
FIG. 1B is an isometric view of a mold assembly embodying the present invention.
Figure 2:
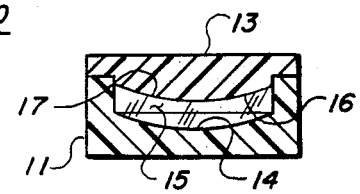
FIG. 2 is a cross sectional view taken on line II—II of the mold assembly of FIG. 1B.

Referring now to the drawing, and more particularly to FIGS. 1 and 2, the mold assembly of the present invention is identified by the general reference 10 and comprises a mold cup 11 having a lens blank cavity 12 formed therein and mold die 13 which is placed upon cup 11 to cover cup 11 and contain therein a suitable mixture of monomers which was prepared and disposed into cavity 12. While the mixture of monomers polymerizes within the cup 11, an adherent relationship is created between the inner surface 14 of cavity 12 and the polymerizing lens materials which cure to form a lens blank 15. As shown in FIGS. 1 and 2, die 13 has a convex lower surface 16 which when die 13 is separated from the polymerized lens material, that is, lens blank 15, creates a true optical surface 17 on lens blank 15 at the interface between the polymerized material 15 and surface 16 of die 13.

Each lens blank 15 is cast into a special mold cup 11 which will hereinafter be described. Blanks 15 can be formed of any suitable polymerizable lens material such as cellulose acetate butyrate, polymethyl methacrylate, silicone acrylate, fluorosilicone acrylate, and like thermosetting and thermoplastic materials in a mold formed of a material calculated to adhere with the lens material so that when the lens material is fully polymerized, the lens material is firmly secured to the mold cup for subsequent shipment therein and final processing as will be described in full detail hereafter.

As mentioned above, the present invention is broadly applicable to optical lenses of all types including contact lenses of the scleral, bifocal, lenticular, spherical, aspheric, toric, intraocular and corneal types as well as daily and extended wear, and other types of contact lenses. The means and methods hereof permit such lenses to be produced from a broad range of plastic materials, both thermoplastic and thermosetting, ranging from the conventional soft hydrophilic materials such as polymers of 2-hydroxylethylene methacrylate cross-linked with ethylene glycol monomethacrylate or N-vinyl-2-pyrrolidone, to the approved gas permeable or hard materials such as cellulose acetate butyrate, silicone acrylate, fluorosilicone acrylate, polymethylmethacrylate, and the like and mixtures thereof.

In practice, mold cup 11 can be formed of a variety of plastic materials which will adhere to the polymerized lens material 14. Suitable materials for producing mold cup 11 include polyetherimide, polyamide, nylon, polycarbonate, acrylonitrile, polysulfone, PMMA, ethylene terephthalate, polybutylene terephthalate, poly(methyl pentene) as well as blended materials such as acrylate styrene acrylonitrile ("ASA") and polycarbonate ("PC"); acrylonitrile butadiene styrene ("ABS") and nylon; ABS and PC; ABS and polytetrafluoroethylene ("PTFE"); ABS and polysulfone; ABS and polyvinyl chloride ("PVC"); ABS and styrene-methacrylate ("SMA"); ASA and poly(methylmethacrylate) ("PMMA"); ASA and PVC; acetal and PTFE; PVC and acrylic; nylon and ethylene copolymers; nylon and polyethylene ("PE"); nylon and PTFE; PC and PE; PC and polyethylene terephthalate ("PET"); PC and SMA; PC and polyurethane ("TPU"); polybutylene terephthalate ("PBT") and PET; PBT and elastomer; PET and elastomer; PET and polysulfone; polyphenylene ether ("PPE") and polystyrene ("PS"); PPE and polyamide; polyphenylene sulfide ("PPS") and PTFE; PS and elastomer; styrene acrylonitrile ("SAN") and ethylene propylene diene ("EPDM"); and SMA and PS and the like.

In practice, the choice of a particular polymer to be employed as the cup material will depend on the specific monomer mixture selected for the lens material.

The die 13 is formed of a variety of plastic materials which will not adhere to the polymerized lens material such as polypropylene, low and high density polyethylene, Teflon®(polytetrafluoroethylene), phenol-formaldehyde polymers, urea formaldehyde, poly chlorotrifluoroethylene and the like.

Both mold cup 11 and die 13 can be fabricated by injection molding with subsequent machining as required.

In a preferred practice of the present invention, mold cup 11 will be formed of one of the above described materials which sets into a relatively soft material which will adhere firmly to the monomers disposed in cavity 12 when they are completely polymerized.

Figure 3:
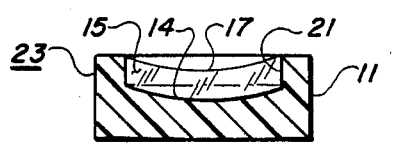
FIG. 3 is a cross section taken on line II—II of FIG. 1B of a radius blank-mold cup button unit having a curved interface between the lens blank and the mold cup in accordance with the present invention.
Figure 4:
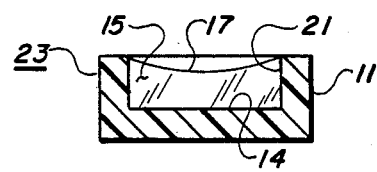
FIG. 4 is a cross section taken on line II—II of FIG. 1B of a radius blank-mold cup button unit having a planar interface between the lens blank and the mold cup in accordance with the present invention.

Mold cup 11 can be contoured to form a radial lens blank surface by shaping the lower surface 14 of cavity 12 as a curve, as shown in FIG. 3 or to form a planar lens blank surface by shaping lower surface 14 in cavity 12 as a plane, as shown in FIG. 4.

Figure 5A:
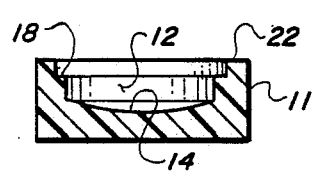
FIG. 5A is a cross section taken on line II—II of FIG. 2 of another mold cup for use with the present invention and having a double stepped mold cup perimeter for the production of oversize lenses.
Figure 5B:
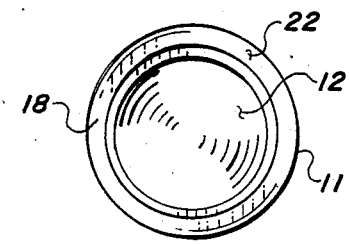
FIG. 5B is a plan elevation of the mold cup of FIG. 5A.

The method of the present invention is also suitable for producing extra large lenses in a mold cup 11 modified to have a larger cylindrical step in cylindrical portion 18, the step being concentrically superposed with cavity 12 as shown in FIGS. 5A and 5B.

Figure 6A:
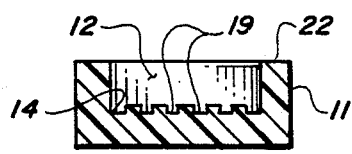
FIG. 6A is a cross section taken on line II—II of FIG. 2 of still another mold cup for use with the present invention having a concentrically grooved cavity surface defined therein.
Figure 6B:
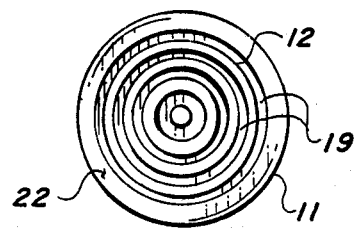
FIG. 6B is a plan elevation of the mold cup of FIG. 6A.
Figure 7A:
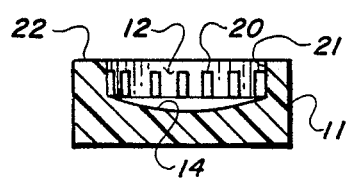
FIG. 7A is a cross section taken on line II—II of FIG. 2 of a modified mold cup for use with the present invention in which axially extending splines are disposed in spaced generally parallel relationship to each other about the inner perimeter of the cavity thereof.
Figure 7B:
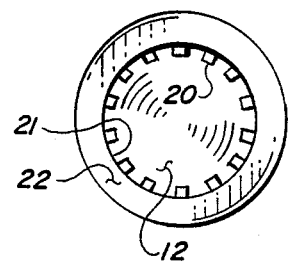
FIG. 7B is a plan elevation of the mold cup of FIG. 7A.

When appropriate, the adherence between the lens blank 15 and mold cup 11 can be mechanically enhanced by defining a plurality of generally concentric grooves 19 in surface 14, as shown in FIGS. 6A and 6B; or by providing a plurality of generally parallel axially extending splines 20 on the inner perimeter 21 of cavity 12, as shown in FIGS. 7A and 7B. In each of these alternative embodiments, grooves 19 and splines 20 serve to enlarge the area of the mating surface occurring between lens blank 15 and mold cup 11 thereby increasing the desired adherence therebetween.

Regardless of which of the several mold cups 11 shown herein and described above is selected for the practice of the present invention, the methodology employed will be basically the same as shall now be described.

First, a mold cup 11 is selected and placed on a level surface. Second, a polymerizable lens material mixture known to provide the properties desired for the lens blank to be formed, will be poured into cavity 12 spreading completely over surface 14 until cavity 12 is properly filled. Die 13 is then placed thereupon with surface 16 engaging the lens material and die 13 resting on the upper annular or die supporting surface 22 of cup 11. Die 13 and mold cup 11 then coact to contain and shape the mixed monomers while they are polymerized into a lens blank. Curing is usually enhanced by heating the mold to a temperature of at least 30° C. but not more than 100° C. for a period of at least 30 minutes but not more than about 24 hours, depending on the monomers chosen for the lens material, the particular initiators admixed therein, and the source of the heat, that is, oven, radiator, ultraviolet lamps or like sources of uniform heat. When the polymer is fully cured, the heat source is removed and die 13 is separated from the lens blank 15 and removed from the mold cup 11 and the resulting integrally formed blank-mold cup unit or button 23 is collected for shipment as needed. Blank-mold cup unit 23 is essentially the same size as the unsheathed lens blanks shipped by the prior art. This provides an even further advantage which will now be described.

The contact lens laboratory will manufacture a contact lens from the blank-mold cup unit 23, shown in FIGS. 3 and 4, by first machining the mold-cup 11 portion, which as indicated is formed of a relatively soft material which can be quickly and easily machined away with little or no wear on the grinding tool, off of button 23 until lens blank 15 is exposed. The lens blank 15 is further fabricated into a usable contact lens by machining away the extraneous portions of the blank 15 to produce a lens which is formed from only the uppermost portion of the lens blank 15.

It is apparent that the various parameters, steps and materials herein described are equally applicable for the manufacture of larger optical lenses such as would be used for cameras, telescopes, and like optical devices by upscaling the means and methods herein described and illustrated.

From the foregoing, it becomes apparent that new and useful procedures have been herein described and illustrated which fulfill all of the aforestated objectives in a remarkably unexpected fashion. It is of course understood that such modifications, alterations and adaptations as may readily occur to any artisan having the ordinary skills to which this invention pertains are intended within the spirit of the present invention which is limited only by the scope of the claims appended hereto.

Accordingly, what is claimed is:

1. A mold assembly for producing an integral lens blank-mold cup unit suitable for subsequent finishing into an optical lens comprising: a mold cup having a cylindrical body portion circumscribing and enclosing a cavity defined therein for receiving uncured lens material monomers and a die supporting surface superposed to and disposed upon said body portion around said cavity and adapted to receive a die thereupon for coaction therewith to contain said monomers within said covered cavity while said monomers are cured, said cavity having a lower surface for supporting said lens material monomers before and during curing and firmly adhering to said fully cured lens material, said lower surface having a plurality of spaced concentric grooves defined therein and a radius die positionable upon said die supporting surface while said monomers are cured into adhering engagement with said mold cup and removable therefrom to provide an integral lens blank-mold cup unit.

2. A mold assembly according to claim 1 in which said die has a radiused lower surface formed thereupon and coactive with polymerizing lens materials engaged thereby to form a radiused optical surface therewith.

3. A mold assembly according to claim 2 in which said die is formed of a material non-adherent to said lens material, said non-adherent material being selected from the group consisting of polyethylene, polypropylene, phenol-formaldehyde polymers, urea formaldehyde polymers, poly chlorotrifluoroethylene, and polytetrafluorethylene.

4. A mold assembly according to claim 8 in which said mold cup is formed of a polymer selected from the group consisting of polyetherimide, polyamide, nylon, polycarbonate, polyacrylonitrile, polysulfone, PMMA, polyethylene terephthalate, polybutylene terephthalate, polymethyl pentene, and blended materials selected from the group consisting of acrylate styrene acrylonitrile ("ASA") and polycarbonate ("PC"); acrylonitrile butadiene styrene ("ABS") and nylon; ABS and PC; ABS and polytetrafluoroethylene ("PTFE"); ABS and polysulfone; ABS and polyvinyl chloride ("PVC"); ABS and styrene methacrylate ("SMA"); ASA and polymethylmethacrylate ("PMMA"); ASA and PVC; acetal and PTFE; PVC and acrylic; nylon and ethylene copolymers; nylon and polyethylene ("PE"); nylon and PTFE; PC and PE; PC and polyethylene terephthalate ("PET"); PC and SMA; PC and polyurethane ("TPU"); polybutylene terephthalate ("PBT") and PET; PBT and elastomer; PET and elastomer; PET and polysulfone; polyphenylene ether ("PPE") and polystyrene ("PS"); PPE and polyamide; polyphenylene sulfide ("PPS") and PTFE; PS and elastomer; styrene acrylonitrile ("SAN") and ethylene propylene diene ("EPDM"); and SMA and PS.

5. A mold assembly according to claim 1 in which said lower surface is planar.

6. A mold assembly according to claim 1 in which said lower surface is curved.

7. A mold assembly according to claim 1 in which said cavity has a plurality of spaced axially extending splines defined on the inner perimeter thereof.

8. A mold assembly for producing an integral lens blank-mold cup unit suitable for subsequent finishing into an optical lens comprising: a mold cup having a cavity defined therein for receiving uncured lens material monomers and a die supporting surface superposed to and circumscribing said cavity and adapted to receive a die thereupon for coaction therewith to contain said monomers within said covered cavity while said monomers are cured, said mold cup being formed of a polymer adherent to said lens material, said polymer being selected from the group consisting of polyetherimide, polyamide, nylon polycarbonate, polyacrylonitrile, polysulfone, PMMA, polyethylene terephthalate, polybutylene terephthalate, polymethyl pentene, and blended materials selected from the group consisting of acrylate styrene acrylonitrile ("ASA") and polycarbonate ("PC"), acrylonitrile butadiene styrene ("ABS") and nylon, ABS and PC, ABS and polytetrafluoroethylene ("PTFE"), ABS and polysulfone, ABS and polyvinyl chloride ("PVC"), ABS and styrene methacrylate ("SMA"), ASA and polymethylmethacrylate ("PMMA"), ASA and PVC, acetal and PTFE, PVC and acrylic, nylon and ethylene copolymers, nylon and polyethylene ("PE"), nylon and PTFE, PC and PE, PC and polyethylene terephthalate ("PET"), PC and SMA, PC and polyurethane ("TPU"), polybutylene terephthalate ("PBT") and PET, PBT and elastomer, PET and elastomer, PET and polysulfone, polyphenylene ether ("PPE") and polystyrene ("PS"), PPE and polyamide, polyphenylene sulfide ("PPS") and PTFE, PS and elastomer, styrene acrylonitrile ("SAN"), and ethylene propylene diene ("EPDM"), and SMA and PS; and a radius die positionable upon said die supporting surface while said monomers are cured into adhering engagement with said mold cup and removable therefrom to provide an integral lens blank-mold cup unit, said die being formed of a material nonadherent to said lens material, said non-adherent material being selected from the group consisting of polyethylene, polypropylene, phenol-formaldehyde polymers, urea formaldehyde polymers, poly chlorotrifluoroethylene, and polytetrafluoroethylene and having a radiused lower surface formed thereupon and coactive with polymerizing lens materials engaged thereby to form a radiused optical surface therewith.

9. A mold assembly according to claim 12 in which said mold cup has a cylindrical body portion circumscribing and enclosing said cavity.

10. A mold assembly according to claim 9 in which said cavity has a lower surface for supporting said lens material monomers before and during curing and firmly adhering to said fully cured lens material.

11. A mold assembly according to claim 10 in which said lower surface is planar.

12. A mold assembly according to claim 10 in which said lower surface is curved.

13. A mold assembly according to claim 10 in which said cavity has a plurality of spaced axially extending splines defined on the inner perimeter thereof.

14. A mold assembly according to claim 10 in which said lower surface has a plurality of spaced concentric grooves defined therein.

15. A mold assembly according to claim 12 in which said mold cup has a cylindrical body portion circumscribing and enclosing said cavity.

16. A mold assembly according to claim 15 in which said cavity has a lower surface for supporting said lens material monomers before and during curing and firmly adhering to said fully cured lens material.

17. A mold assembly for producing an integral lens blank-mold cup unit suitable for subsequent finishing into an optical lens comprising: a mold cup having a cavity defined therein for receiving uncured lens material monomers and a die supporting surface superposed to and circumscribing said cavity and adapted to receive a die thereupon for coaction therewith to contain said monomers within said covered cavity while said monomers are cured, said mold cup being formed of a polymer selected from the group consisting of polyetherimide, polyamide, nylon, polycaronate, polyacrylonitrile, polysulfone, PMMA, polyethylene terephthalate, polybutylene terephthalate, polymethyl pentene, and blended materials selected form the group consisting of acrylate sytrene acrylonitrile ("ASA") and polycarbonate ("PC"), acrylonitrile butadiene styrene ("ABS") and nylon, ABS and PC, ABS and polytetrafluoroethylene ("PTFE"), ABS and polysulfone, ABS and polyvinyl chloride ("PVC"), ABS and styrene methacrylate ("SMA"), ASA and polymethylmethacrylate ("PMMA"), ASA and PVC, acetal and PTFE, PVC and acrylic, nylon and ethylene copolymers, nylon and polyethylene ("PE"), nylon and PTFE, PC and PE, PC and polyethylene terephthalate ("PET"), PC and SMA, PC and polyurethane ("TPU"), polybutylene terephthate ("PBT") and PET, PBT and elastomer, PET and elastomer, PET and polysulfone, polyphenylene ether ("PPE") and polystyrene ("PS"), PPE and polyamide, polyphenylene sulfide ("PPS") and PTFE, PS and elastomer, styrene acrylonitrile ("SAN") and ethylene propylene diene ("EPDM"), and SMA and PS; said mold cup having a cylindrical body portion circumscribing and enclosing said cavity, said cavity having a lower surface for supporting said lens material monomers before and during curing and firmly adhering to said fully cured lens material, said lower surface having a plurality of spaced concentric grooves defined therein; and a radius die positionable upon said die supporting surface while said monomers are cured into adhering engagement with said mold cup and removable therefrom to provide an integral lens blank-mold cup unit.

18. A mold assembly according to claim 17 in which said die has a radiused power surface formed thereupon and coactive with polymerizing lens materials engaged thereby to form a radiused optical surface therewith.

19. A mold assembly according to claim 18 in which said die is formed of a material nonadherent to said lens material, said non-adherent material being selected from the group consisting of polyethylene, polypropylene, phenol-formaldehyde polymers, urea-formaldehyde polymers, poly chlorotrifluorethylene, and polytetrafluorethylene.

20. A mold assembly according to claim 17 in which said lower surface is planar.

21. A mold assembly according to claim 17 in which said lower surface is curved.

22. A mold assembly according to claim 17 in which said cavity has a plurality of spaced axially extending splines defined on the inner perimeter thereof.

* * * * *

UNITED STATES PATENT AND TRADEMARK OFFICE
CERTIFICATE OF CORRECTION

PATENT NO. : 4,921,205
DATED : MAY 1, 1990
INVENTOR(S) : Arthur J. Drew, Jr.; Donald J. Ratkowski It is certified that error appears in the above-identified patent and that said Letters Patent is hereby corrected as shown below:

Column 2, line 61, delete "filter" substitute --- fitter ---

Claim 18, Column 10, line 2, delete "power" substitute --- lower ---

Signed and Sealed this

Sixteenth Day of November, 1993

Attest:

BRUCE LEHMAN

Attesting Officer      Commissioner of Patents and Trademarks